United States Patent
Uphoff

(10) Patent No.: US 7,385,336 B2
(45) Date of Patent: Jun. 10, 2008

(54) MICROBIOLOGICAL ENERGY SOURCE FOR DRIVING A CONSUMER

(75) Inventor: Heinrich Josef Uphoff, Aschau im Chiemgau (DE)

(73) Assignee: Georg Fritzmeier GmbH & Co. KG, Grosshelfendorf (DE)

( * ) Notice: Subject to any disclaimer, the term of this patent is extended or adjusted under 35 U.S.C. 154(b) by 151 days.

(21) Appl. No.: 10/496,370

(22) PCT Filed: Nov. 22, 2002

(86) PCT No.: PCT/DE02/04295

§ 371 (c)(1),
(2), (4) Date: Jun. 1, 2004

(87) PCT Pub. No.: WO03/045848

PCT Pub. Date: Jun. 5, 2003

(65) Prior Publication Data

US 2004/0256958 A1 Dec. 23, 2004

(30) Foreign Application Priority Data

Nov. 23, 2001 (DE) ................ 101 57 191

(51) Int. Cl.
*H02N 2/08* (2006.01)
*H01L 41/113* (2006.01)
(52) U.S. Cl. ...................... 310/339; 210/205
(58) Field of Classification Search ............... 310/339; 210/205, 295

See application file for complete search history.

(56) References Cited

U.S. PATENT DOCUMENTS 4,904,394 A * 2/1990 Clarke et al. ............... 210/739
4,987,068 A * 1/1991 Trosch et al. ................ 435/41
5,459,699 A * 10/1995 Walter ........................ 367/142
5,464,539 A * 11/1995 Ueno et al. ................. 210/603
6,030,048 A * 2/2000 Hsu ............................. 299/4
6,736,979 B2 * 5/2004 de Meulenaer et al. ..... 210/695
6,770,248 B2 * 8/2004 Haggett et al. ............. 422/128
6,797,158 B2 * 9/2004 Feke et al. .................. 210/97
6,818,128 B2 * 11/2004 Minter ........................ 210/205
6,951,616 B2 * 10/2005 Dahlberg .................... 210/748
2002/0106540 A1* 8/2002 Shioya ......................... 429/19
2002/0182459 A1* 12/2002 Hockaday et al. ........... 429/19

(Continued)

FOREIGN PATENT DOCUMENTS

DE 43 45 148 A1 12/1994

(Continued)

OTHER PUBLICATIONS

Jung et al.; "Enhancement of Phenol Biodegradation by South Magnetic Field Exposure"; J. Chem. Technol. Biotechnol.; 1997, No. 70; pp. 299-303.

*Primary Examiner*—J. San Martin
(74) *Attorney, Agent, or Firm*—Oliff & Berridge, PLC

(57) ABSTRACT

A microbiological energy source for driving an electrical or mechanical consumer is disclosed, wherein at least one filling body having a piezoelectric or similar effect is received in a bioreactor. This bioreactor encloses waste water flowing through it, and contains a mixture of microorganisms that form a positive pole and a negative pole of the energy source as a result of the microbiological decomposition of organic matter contained in the waste water.

10 Claims, 2 Drawing Sheets

U.S. PATENT DOCUMENTS

| | | | |
|---|---|---|---|
| 2003/0070938 A1* | 4/2003 | Mali | 205/637 |
| 2004/0026385 A1* | 2/2004 | Koulik et al. | 219/121.36 |
| 2004/0108203 A1* | 6/2004 | Sullivan | 204/276 |
| 2004/0120889 A1* | 6/2004 | Shah et al. | 423/657 |
| 2004/0154994 A1* | 8/2004 | Dahlberg | 210/748 |
| 2004/0200731 A1* | 10/2004 | Sullivan | 205/628 |
| 2005/0000914 A1* | 1/2005 | Dahlberg et al. | 210/748 |
| 2005/0183964 A1* | 8/2005 | Roberts et al. | 205/701 |
| 2005/0260553 A1* | 11/2005 | Berzin | 435/3 |

FOREIGN PATENT DOCUMENTS

| | | |
|---|---|---|
| DE | 195 14 931 A1 | 10/1996 |
| DE | 101 18 839 A1 | 10/2002 |
| EP | 0 210 493 A2 | 2/1987 |
| JP | 9-099291 | 4/1997 |

* cited by examiner

MICROBIOLOGICAL ENERGY SOURCE FOR DRIVING A CONSUMER

The invention concerns a microbiological energy source for driving a consumer, for example an electric motor.

In the field of waste water purification, efforts have been under way to convert the biological processes of self-purification in bodies of water under natural conditions in temporally and spatially limited reactions in waste water processing plants, so that the purification process may unfold substantially more rapidly than in a natural way, and with a reactor volume as small as possible. One essential aspect is the use and concentration of the micro-organisms that are used for decomposition and digestion of the undesirable constituents of the waste water.

In patent application DE 100 62 812 to the present applicant, a microbiotic mixed culture for the treatment of polluted waste water is proposed, wherein a proportion of photosynthetically active micro-organisms and a proportion of luminous bacteria are contained. Although this mixed culture has already been put to use successfully, it is a problem that a certain minimum proportion of luminous bacteria has to be present in order to initiate the interaction between photosynthetically active micro-organisms and the luminous bacteria described in this application.

In order to improve growth of the micro-organisms, it is proposed in the further post-published patent application DE 101 18 839, to apply high-frequency oscillations to the micro-organisms intended for the purification of charged waste water in a bioreactor. These oscillations are in the ultrasonic range, and it could be noted that even at frequencies in a range of 40 kHz a stimulation of growth of the micro-organisms flowing through the bioreactor can be noted. In the known solution, the bioreactor used is a bulk filling material, with the bulk material consisting of permanent-magnetic and piezoelectric filling bodies preferably prepared from ceramic materials.

Particularly in waste water processing technology, efforts are made to energetically convert the products occurring in the waste water purification, in order to keep the energy requirement of the overall plant at a minimum. Thus, e.g., the biogas produced in microbiological conversion of the solids occurring in the waste water purification is utilized for energetically supporting energy-intense processes, such as a combustion, so that as little external energy as possible has to be supplied.

In contrast, the invention is based on the objective of exploiting interactions between the product to be decomposed or converted, and the micro-organisms in the biological waste water or waste processing, in terms of energy.

This objective is attained through a microbiological energy source having a bioreactor including at least one filling body having a piezoelectric or similar effect. The said bioreactor contains micro-organisms which create a potential difference at the filling body owing to the microbiological decomposition of organic matter contained in waste water when waste water flows through said bioreactor so that a voltage may be drawn for operation of a working tool.

In accordance with the invention, the energy source has a bioreactor that is provided with at least one filling body having a piezoelectric or similar effect and contains a mixture of anionic and cationic-micro-organisms forming, upon flowing through the bioreactor and the resulting microbiological decomposition at the filling body, positive and negative electrical poles where current for operation of the electrical consumer may be drawn. This electrical consumer may, for example, be a drive mechanism for a work tool required in the waste water processing.

Anionic and cationic micro-organisms are presently understood to be micro-organisms that are present in preferred ranges of potential owing to physico-chemical reactions during metabolism, and thus gather in the ranges of negative and positive poles. The voltage generated above the filling body may then be utilized for driving an electrical consumer.

In accordance with the invention it is preferred if a filling body bulk material is received in the bioreactor, with a respective positive and negative pole then forming at the filling bodies owing to a corresponding orientation of the micro-organisms, and these single "dipoles" then aligning in such a manner that a directional magnetic field is generated above the bioreactor.

In a particularly advantageous variant, each of the filling bodies forming a "dipole" is given a spherical shape and provided with a ceramic coating that is interrupted at two poles in opposite locations. In this variant it is preferred if the coating consists of titanium oxide. In addition to the bulk material forming "dipoles", a bulk material of permanent magnets may furthermore be provided in the bioreactor. These permanent magnets generate a magnetic field that stimulates growth of particular micro-organisms such as, e.g., single cell organisms, flagellates etc., to thus improve biological conversion.

In a preferred embodiment, these permanent magnets are given a cylindrical shape, so that the turbulence of the medium flowing into the bioreactor, such as the waste water charged with organic matter, is improved.

The filling bodies forming a "dipole" and the permanent-magnetic filling bodies are preferably not received in the bioreactor as a solid bulk material, but packing is performed such that the individual filling bodies are movable relative to each other. It is being assumed that this relative mobility of the filling bodies allows for alignment of the "dipoles."

The efficiency of the microbiological energy source may be enhanced further if hydrogen-producing micro-organisms, for example bacteria, are admixed to the microbiological mixture, so that in the process of biological decomposition or conversion of the organic matter, hydrogen is generated which may be withdrawn from the reactor and exploited energetically. Here it is preferred if the hydrogen may be conducted across a membrane forming a wall section of the bioreactor.

Further advantageous developments include:

1. a bulk material of filling bodies received in the bioreactor, where each of the filling bodies has a spherical shape and is provided with a coating that contains titanium oxide and is perforated in two opposite regions. The filling bodies are arranged such as to be movable relative to each other;

2. a bulk material of permanent magnets is provided in the bioreactor. The permanent magnets have a cylindrical shape;

3. a structure for withdrawing hydrogen formed during biological conversion. The hydrogen may be withdrawn across a membrane forming a wall section of the bioreactor. Micro-organisms are present that form the hydrogen as an intermediate or final product in the biological conversion of the organic matter of the waste water.

A preferred embodiment of the invention shall hereinbelow be explained in more detail by referring to schematic drawings, wherein;

FIG. 1 in a schematic view of a bioreactor in accordance with the invention for the formation of a microbiological energy source;

Figure 1:
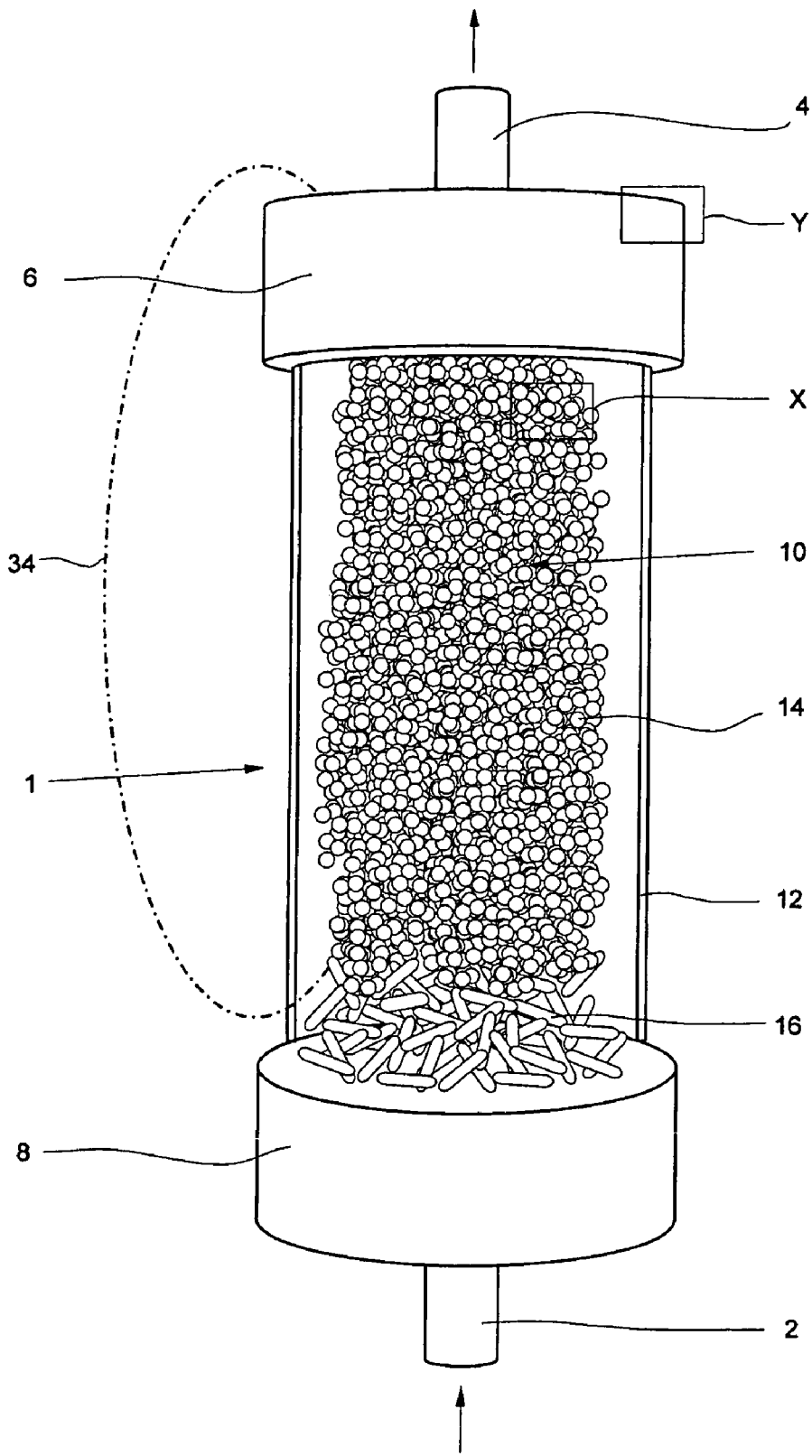

FIG. 1 shows a bioreactor 1 holding waste water charged with organic matter that flows through it. This waste water enters via an inlet 2 into the bioreactor 1 having for instance the shape of a cylindrical column, and exits from it via a central outlet 4. The bioreactor 1 moreover includes a head portion 6 and a bottom part 8, whereby a cylinder 12 of the bioreactor 1 accommodating a bulk material 10 is closed on the end side, and having inlet 2 and outlet 4 formed therein. In the bioreactor 1 certain micro-organisms are moreover present which shall be discussed in the following.

In the embodiment represented in FIG. 1, the bulk material 12 consists of an upper bulk material portion with piezoelectric filling bodies 14 and another portion located upstream and formed of permanent magnets 16 having, for instance, a cylindrical shape. The two bulk materials of filling bodies 14 and permanent magnets 16 do, however, not have the form of a packed bed, but are arranged such that a certain relative mobility of the filling bodies 14 and permanent magnets 16 within the respective portion is possible. In other words, the bulk material is packed very loosely.

Figure 2:
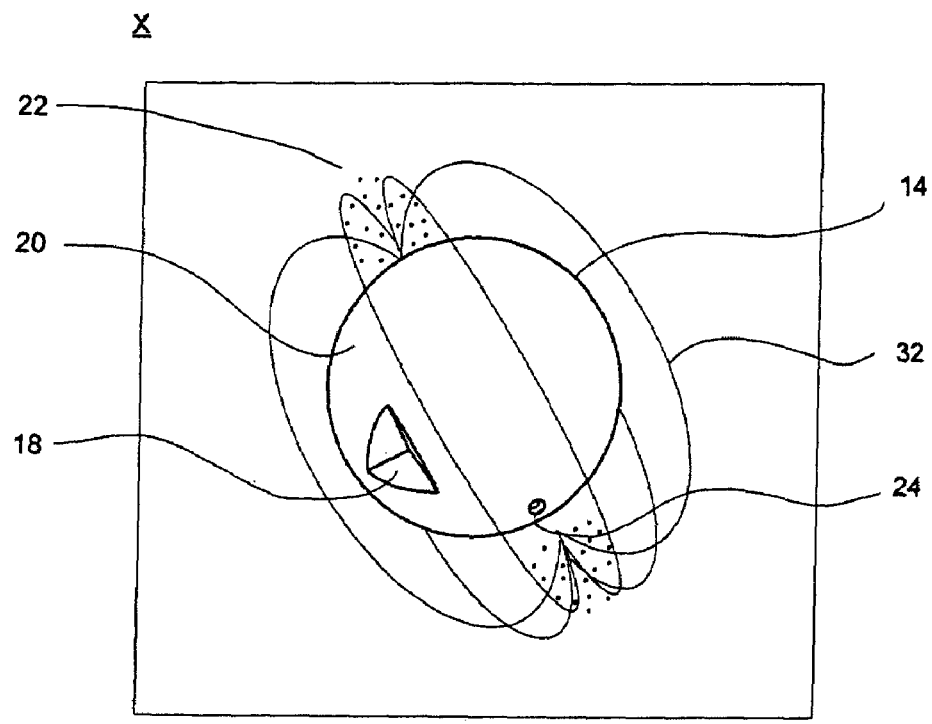
FIG. 2 shows a filling body of the bioreactor of FIG. 1.

FIG. 2 shows an enlarged representation of a piezoelectric filling body 14 received in the region X.

Accordingly, the filling body 14 is about spherical in shape and has a core 1I of a ceramic material having piezoelectric properties. In the event of a deformation of the core matrix under the influence of mechanical force (pressure, pull, torsion), electrical charges are created at the surface of this material, or vice versa upon application of an electrical voltage, mechanical deformations of the ceramic material can be noted which may be utilized, e.g., in microtechnology for controlling components, or in printer technology for the ejection of ink.

This core 18 of piezo ceramic has a coating 20 of titanium oxide ($TiO_2$) applied on it. The layer thickness preferably is in the range between 200 to 1000 nm—different layer thicknesses are, of course, also conceivable. This coating 20 acts as a protective jacket, so that toxic constituents of the piezo ceramic, such as lead, for instance, will not interact with the waste water.

As is moreover indicated in FIG. 2, following application of the coating 20, the filling body 14 is dotted in two diametrically located regions—in other words, dot-shaped perforations of the coating are created in these regions 22, 24, so that the core 8 contacts the waste water in these dot-shaped portions. These contact regions are, however, made to be very small to preclude the occurrence of interactions with the piezo ceramic likely to contaminate the waste water.

Figure 3:
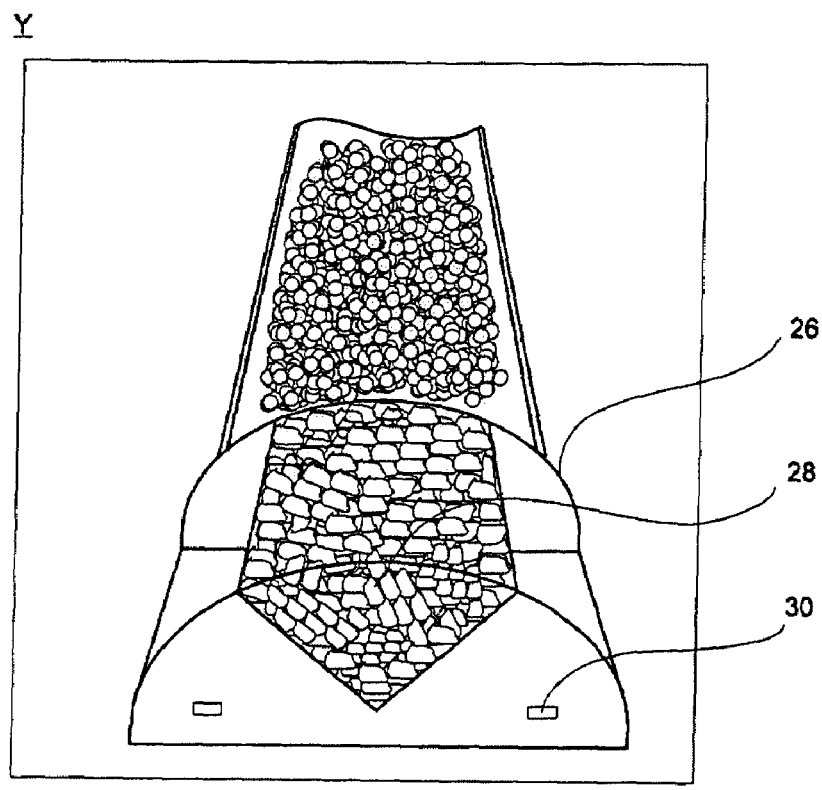
FIG. 3 is a sectional view of a head portion of the bioreactor of FIG. 1.

FIG. 3 shows a detail Y of the head portion 6 represented in FIG. 1. Accordingly, this head portion includes an outer jacket 26 encompassing a membrane 28. The latter may be manufactured, e.g., of ceramic material and has an active pore width permitting withdrawal of hydrogen ($H_2$) from the bioreactor 1 through the membrane 28 via outlet openings 30. The pore width of the membrane 28 is, on the other hand, too small to allow waste water or other constituents of the waste water or micro-organisms to leave through the outlet openings 30.

Thanks to this design of the bioreactor 1 it is made possible that the waste water is extracted via outlet 4, while hydrogen generated during the biological conversion—to be described in more detail hereinbelow—may be supplied to another use via the membrane 28.

As was already mentioned at the outset, the bioreactor 1 or the entering waste water contains a biological mixed culture having a predetermined composition. Details of this biological mixed culture are described in the application DE 100 62 812, which is hereby included by reference. For better comprehension, only the essential components of the mixed culture shall be explained. It contains a proportion of photosynthetically active micro-organisms and a proportion of luminous bacteria or light-emitting micro-organisms having a similar activity, that are dispersed in a broad-band biological solution and are added to the waste water. The interaction between the photosynthetically active micro-organisms and the luminous bacteria as described in the above identified patent application has the result that the photosynthetically active bacteria are stimulated to photosynthesis by the luminous bacteria. The micro-organisms bring about photosynthesis with hydrogen sulphide and water as an educt and liberate sulphur or oxygen. Moreover they may fix nitrogen and phosphate, and decompose organic and inorganic matter. The mixture moreover contains additional micro-organisms generating hydrogen during the microbiological conversion.

Photosynthetically active micro-organisms that are facultatively phototropic are preferred in the supplied microbiological composition. Phototropic facultatively means that the micro-organisms can grow both under anaerobic conditions in light and under aerobic conditions in the dark.

Among the photosynthesis bacteria there are gram-negative aerobic rod-shaped and circular bacteria and gram-positive circular bacteria. These may include endospores or be present without spores. Among them there are for instance also gram-positive actinomycetes and related bacteria.

In this context it is also possible to name nitrogen-fixing organisms. Among these there are, e.g., algae, such as Anabena *Nostoc* in symbiosis with Azola. Moreover it is possible to name *actinomycetes*, e.g. Frankia in symbiosis with alder and bacteria, such as *Rhizobium* in symbiosis with *laguminosae*.

Moreover it is also possible to use aerobic algae, azotobacter, methane-oxidizing bacteria and sulphur bacteria. Among these there are also green sulphur bacteria and brown-green photosynthesis bacteria. Here one may also name non-purple sulphur bacteria and purple sulphur bacteria.

It is preferred if, in the microbiological composition in accordance with the invention, prochlorophytes, cyanobacteria, green sulphur bacteria, purple bacteria, chloroflexus-type forms and heliobacterium and heliobacillus-type forms are contained as facultatively phototropic micro-organisms. The above named facultatively phototropic micro-organisms may also be present as mixtures of two or more of them. In a quite particular embodiment, all six of the above named micro-organisms are present as a mixture.

The light which powers photosynthesis originates from the luminous bacteria contained in the microbiological composition of the present invention as the second essential component. These luminous bacteria possess luminosity, i.e., they are capable of emitting photons. This is a System that operates enzymatically. As an example, one may here name the luciferin/luciferase system.

In one preferred embodiment, *Photobacterium phosphoreum, Vibrio fischeri, Vibrio harveyi, Pseudomonas lucifera* or Beneckea are contained in the mixture as luminous bacteria. It is also possible to select a mixture of at least two of these.

In order to optimize the microbiological composition of the invention, additional constituents may be contained in it. Preferably such secondary constituents are plant extracts, enzymes, trace elements, polysaccharides, alginic derivatives, other micro-organisms as above. The secondary constituents may be present in the microbiological composition of the invention either singly or in combination. The plant extracts may contain, e.g., ribwort, hops, etc.

Optionally added lactic acid bacteria serve to suppress pathogenic germs and lower the pH value.

As a nutrient solution for the microbiological composition of the invention, a solution is generally used which contributes to making life readily possible for the constituents contained therein, in particular for the micro-organisms. Here it is particularly crucial to allow full interaction of the photosynthesis bacteria and of the luminous bacteria to unfold. It was found that a biological nutrient solution including molasses, in particular raw sugar molasses or sugar beet molasses, is suited as a main ingredient.

The photosynthetically active micro-organisms and the luminous bacteria normally are present in the microbiological composition of the invention in a ratio of 1:10 to 1:500. A preferred ratio is 1:100.

In the course of flowing through the bioreactor 1 together with the waste water containing organic matter, the micro-organisms deposit in a preferred manner on the surface of the piezoelectric filling bodies 14. It was found that—presumably owing to the radiation emitted by the luminous bacteria—the titanium oxide coating is activated such that the surface tension of the substance surrounding the piezo-electric filling body 6 is reduced, and these distribute homogeneously over the surface of the filling bodies.

There forms a kind of biofilm surrounding the filling bodies 6 and substantially made up of a mucus-type, extracellular polymer substance (EPS), in which the micro-organisms are embedded. This EPS prevents toxic substances in the waste water (such as heavy metals) from penetrating inside the cells of the micro-organisms. The EPS moreover acts as a diffusion barrier preventing substances required for the biological conversion such as exoenzymes, for example, from being diffused to the outside. The EPS acts like a semi-permeable membrane that supports decomposition of the organic matter dissolved in the waste water. Depending on the kind of micro-organisms, they deposit in a preferred manner in the range of regions 22 or 24. Moreover bacteria living in symbiosis with other used bacteria use the EPS as a means to be able to remain physically close to these bacteria.

Owing to the reduced surface tension of this biofilm, it is practically not possible for contaminants contained in the waste water to settle on the surface of the filling bodies, for they are eroded by the biofilm, and the latter is deposited on the titanium oxide layer with a high strength of adhesion.

With use of the mixed culture developed by the applicant, luminous bacteria and photosynthetically active bacteria accumulate in the biofilm, resulting in a kind of "luminous film" that surrounds the piezo ceramic filling bodies 6.

It was found that in a region 22, preferably micro-organisms accumulate which obtain electrons from the reduction equivalents of their substrates to transfer them to other recipients, whereas in the other region 24, preferably micro-organisms accumulate which reduce constituents of the waste water, for example molecular hydrogen, as an electron source for the metabolism. In other words, a negative and a positive pole form in the regions 22 and 24 depending on the kind of the accumulated micro-organisms, so that practically each piezoelectric filling body 14 by itself represents a kind of "dipole." The lines of magnetic flux 32 of this microsystems are drawn in FIG. 2, with the cloud above the regions 22, 24 representing the micro-organisms.

It was surprisingly found that when the bulk material 10 is packed in a suitable manner, the single piezoelectric filling bodies 14 will align, when waste water flows about them, such that the lines of electric flux extend substantially in parallel. An electric field in accordance with FIG. 1 forms the lines of electric flux 34 having approximately the shape represented in FIG. 1. Accordingly a positive pole (V+) and a negative pole (V−) form along the bioreactor 1 owing to the orientation of the filling bodies 14, so that a voltage may be drawn. According to measurements performed by the applicant, the formed electric field has sufficient strength to provide enough power for driving an electric motor. This means that the electric field formed during the biological conversion of the organic matter of the waste water above the bioreactor 1 may be utilized for driving an electrical consumer, for instance an electric motor. In waste water purification plants it is particularly advantageous if this energy is employed for driving stirring means, screens, conveyors, or other apparatus of the waste water purification plant.

The permanent magnets 16 arranged in the lower or upper part of the bulk material on the one hand ensure the presence of a turbulent flow within the bioreactor 1 due to their sharp-edged configuration, and moreover the growth of certain micro-organisms is additionally stimulated by this permanent-magnetic field.

As was already mentioned above, some micro-organisms are utilized which form gaseous hydrogen as an intermediate or final product. Such hydrogen forms, e.g., during photocatalysis, with sulphate ($SO_4^{2-}$) being reduced, and hydrogen and sulphur being released. This gaseous hydrogen may exit through the membrane 28 and the outlet openings 30 from the bioreactor 1 and is discharged through suitable discharge means, to be utilized in terms of energy. Thus it is possible, e.g., to energetically exploit this hydrogen obtained in bioreactor 1 in a fuel cell.

The above described bioreactor may thus have a twofold use, with formed gases and also formed force field being utilized for generating electrical or mechanical energy.

What is disclosed is a microbiological energy source for driving an electrical or mechanical consumer, wherein at least one filling body having a piezoelectric or similar effect is received in a bioreactor. This bioreactor encloses waste water flowing through it, and contains a mixture of micro-organisms that form a positive pole and a negative pole of the energy source as a result of the microbiological decomposition of organic matter contained in the waste water.

1. bioreactor
2. inlet
4. outlet
6. head portion
8. bottom part
10. bulk material
12. cylinder
14. piezoelectric filling body
16. permanent magnet
18. core
20. coating
22. dotted region
24. dotted region
26. outer jacket
28. membrane
30. outlet opening
32. lines of magnetic flux

The invention claimed is:

1. A microbiological energy source for driving an energy consumer, comprising:
   a bioreactor including one or more filling bodies having a piezoelectric effect; and
   a permanent magnetic field in the bioreactor, wherein:
   the filling bodies form electric dipoles due to deformation caused by streaming pressure of waste water streaming through the bioreactor, and
   the bioreactor contains a mixture of anionic and cationic micro-organisms which, because of the microbiological decomposition of organic matter contained in the waste water, accumulate at poles of the electric dipole and create a voltage difference, and the voltage difference is capable of being supplied to a working tool.

2. The energy source in accordance with claim 1, further comprising a bulk material of filling bodies that is disposed in the bioreactor.

3. The energy source in accordance with claim 2, wherein each of the filling bodies has a spherical shape and is provided with a coating that is perforated in two opposite regions.

4. The energy source in accordance with claim 3, wherein said coating contains titanium oxide.

5. The energy source in accordance with claim 1, wherein a bulk material of permanent magnets is provided in said bioreactor.

6. The energy source in accordance with claim 5, wherein said permanent magnets have a cylindrical shape.

7. The energy source in accordance with claim 1, wherein said filling bodies are arranged such as to be movable relative to each other.

8. The energy source in accordance with claim 1, including means for withdrawing hydrogen formed during biological conversion.

9. The energy source in accordance with claim 8, wherein the hydrogen may be withdrawn across a membrane forming a wall section of said bioreactor.

10. The energy source in accordance with claim 8, wherein micro-organisms are present that form hydrogen as an intermediate or final product in the biological conversion of the organic matter of the waste water.

* * * * *